Inventors
JOHN HOHL
R. K. BELNAP, JR.
H. A. BARNBY.
By Rule and Hoge,
Attorneys

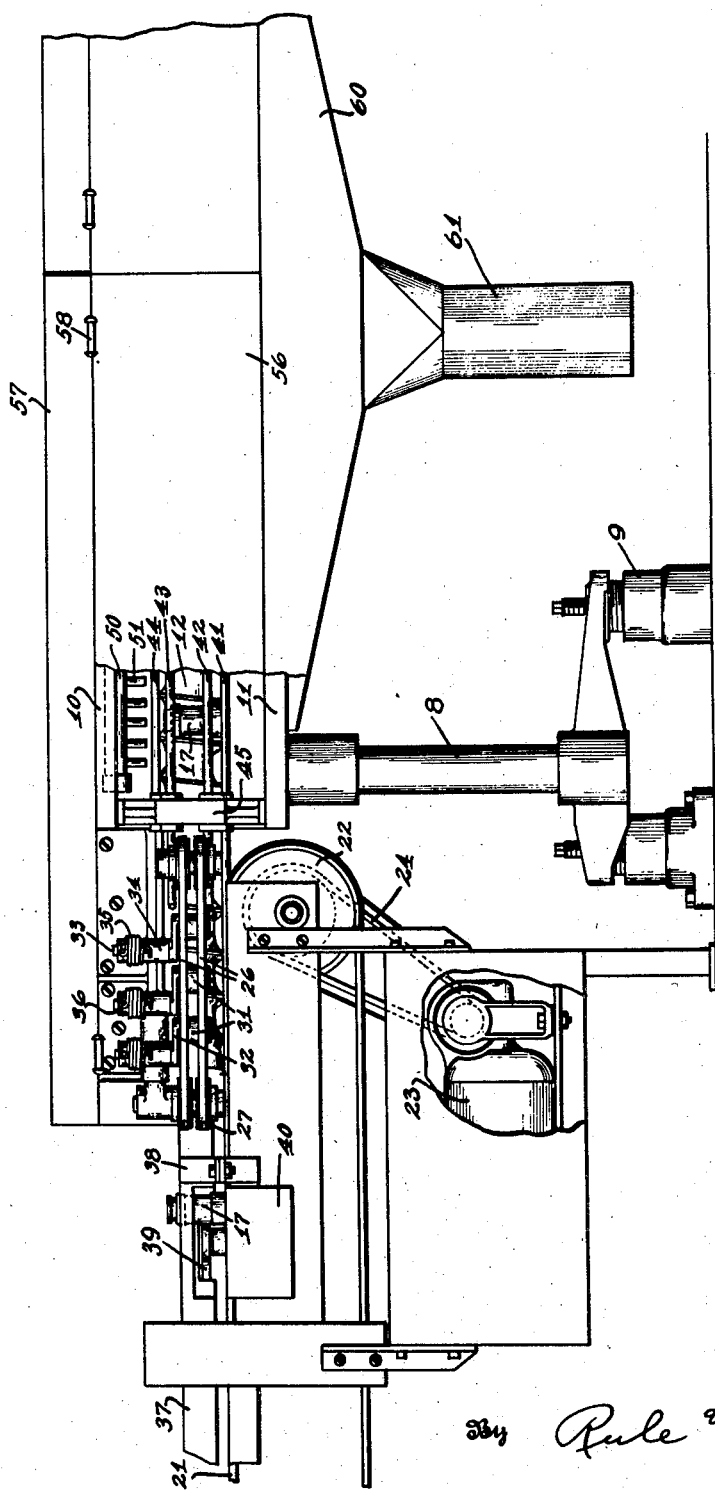

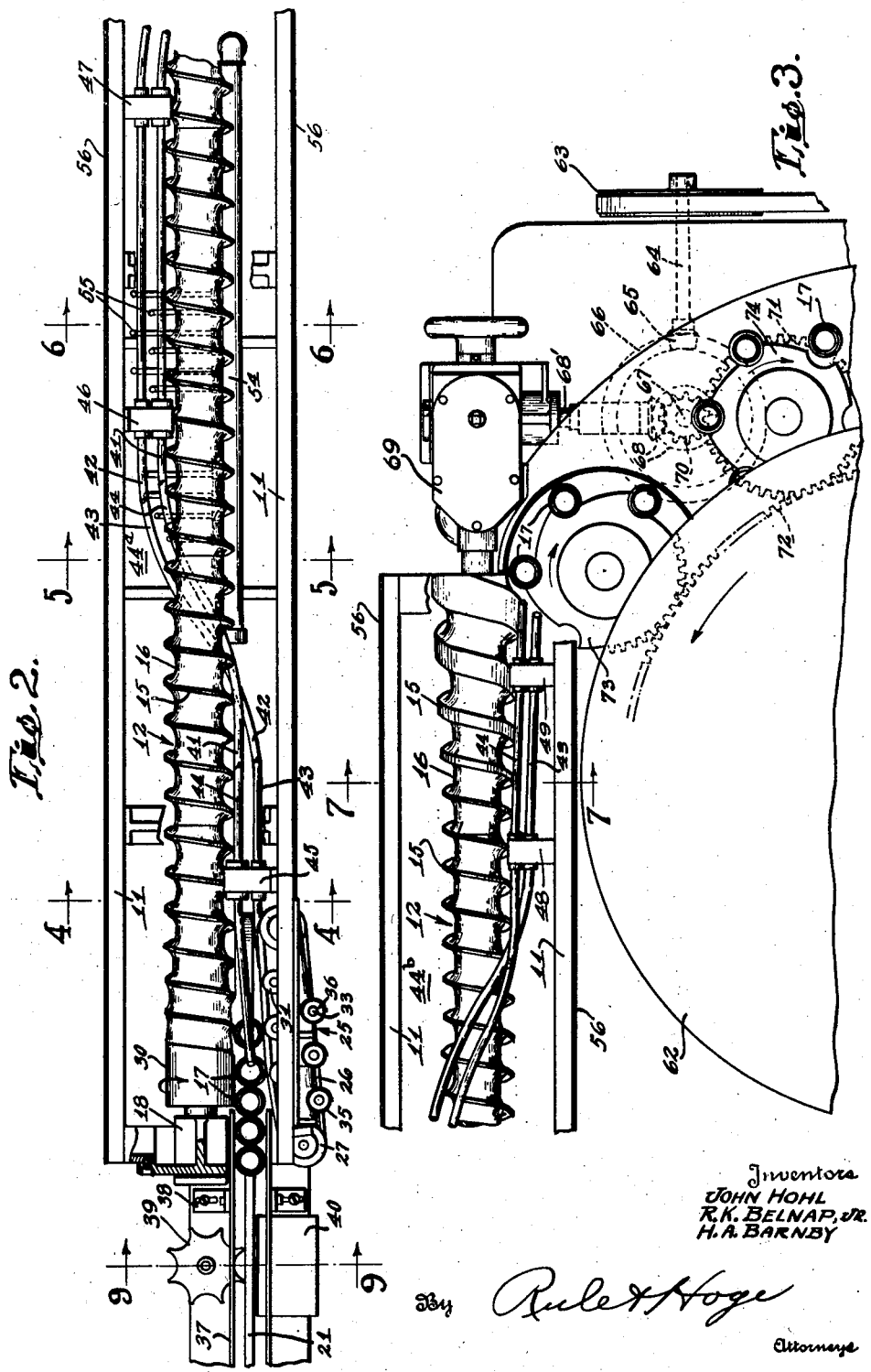

Feb. 8, 1949.   J. HOHL ET AL   2,461,277
ARTICLE CONVEYING MECHANISM
Filed Nov. 16, 1944    4 Sheets-Sheet 4
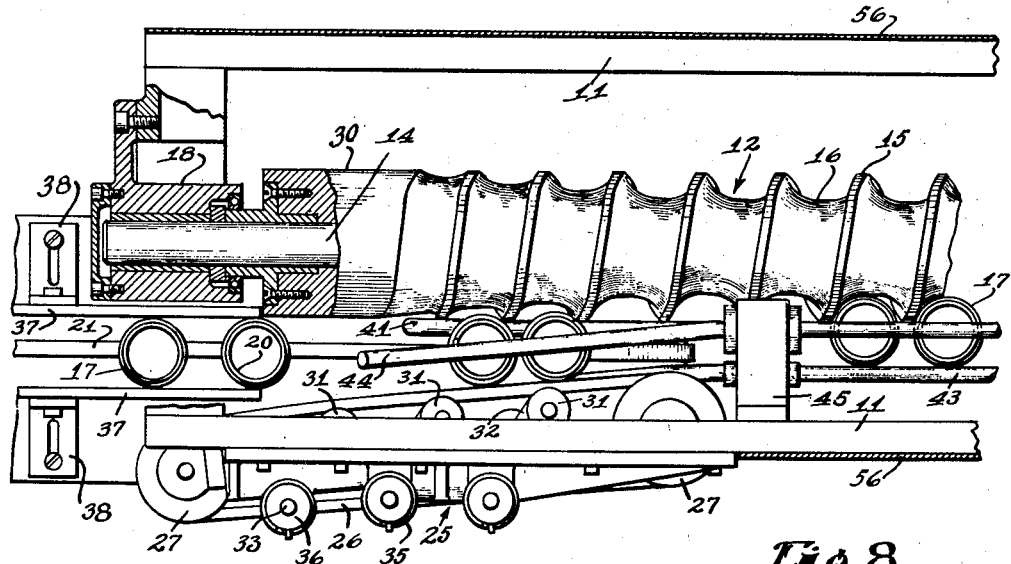
Fig. 8.
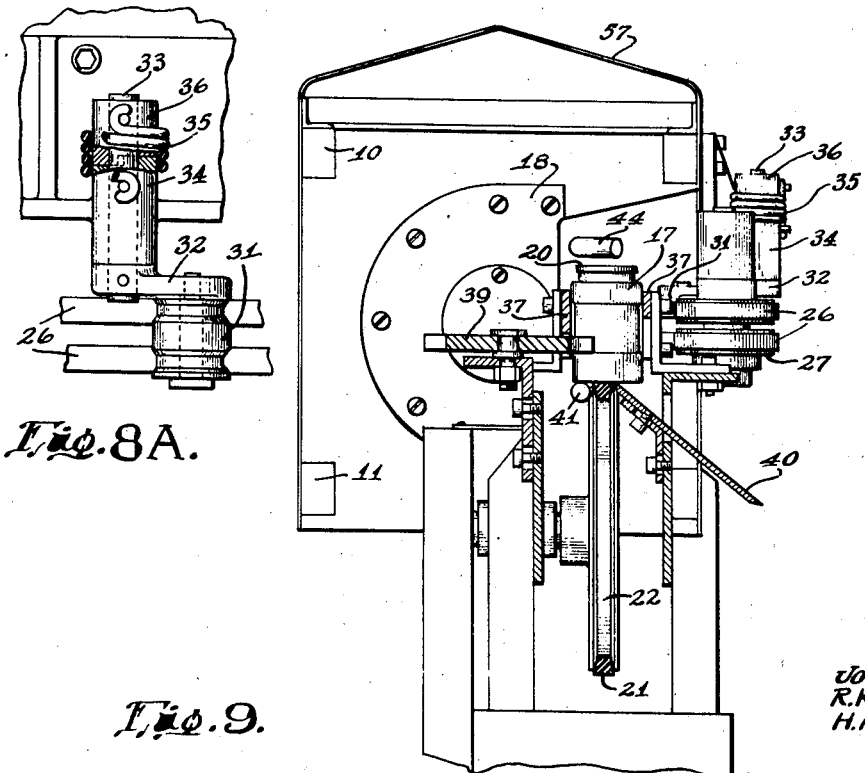
Fig. 8A.
Fig. 9.
Inventors
JOHN HOHL
R. K. BELNAP JR.
H. A. BARNBY
By Rule and Hoge
Attorneys Patented Feb. 8, 1949

2,461,277

UNITED STATES PATENT OFFICE 2,461,277

ARTICLE CONVEYING MECHANISM

John Hohl, Robert K. Belnap, Jr., and Herbert A. Barnby, Toledo, Ohio, assignors to Owens-Illinois Glass Company, a corporation of Ohio Application November 16, 1944, Serial No. 563,720

9 Claims. (Cl. 198—33)

Our invention relates to apparatus for transferring containers, such as bottles and jars, from one station to another, and washing them while in transit.

An object of the invention is to provide mechanism adapted for receiving containers, such as glass jars, as they are taken from shipping cartons, rapidly conveying them to a filling machine, and washing and preheating the containers during such transfer, thereby removing any dust, particles of paper, or other foreign material and presenting the containers while hot, to the filling machine.

A further object of the invention is to provide novel and reliable means for synchronizing the movements of the transfer mechanism with those of the filling machine and timing the delivery of the containers to said machine.

A still further object of the invention is to provide new and improved means for reliably feeding the containers to a worm conveyor by which they are conveyed, while being washed, to the filling machine.

Other objects of the invention will appear hereinafter.

Referring to the accompanying drawings which illustrate apparatus embodying our invention:

Fig. 1 is a side elevation of a portion of the apparatus, parts being broken away, and shows mechanism for delivering the containers to the worm conveyor.

Fig. 2 is a fragmentary part-sectional plan view showing a major portion of the worm conveyor and the mechanism for delivering the containers thereto.

Fig. 3 is a similar view showing the remaining portion of the worm conveyor and the mechanism for transferring the containers therefrom to the filling machine.

Figs. 4 to 9 are detail views on a comparatively large scale.

Figure 4:
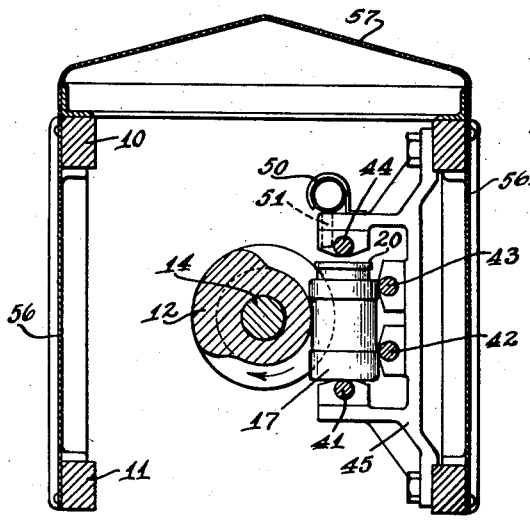
Figure 5:
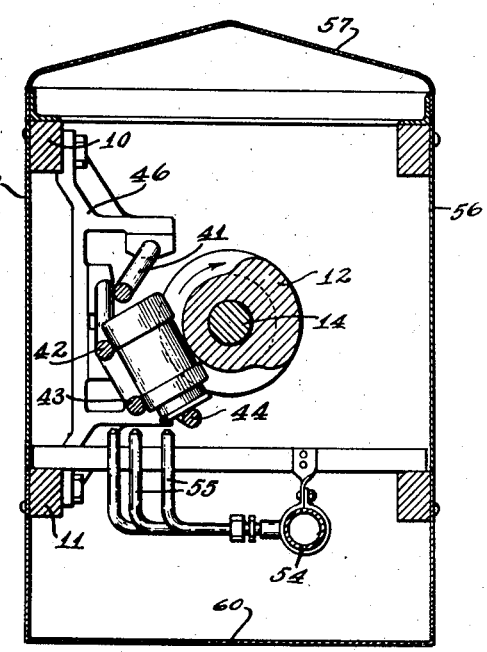
Figure 6:
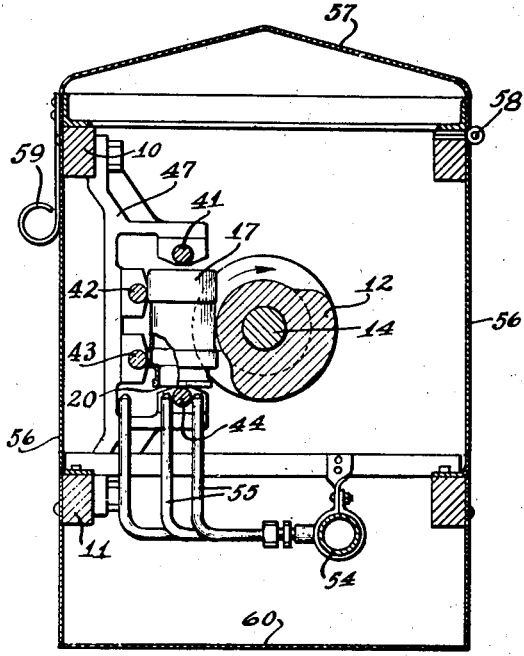

Figs. 4, 5, and 6 are cross-sectional elevations at lines 4—4, 5—5, and 6—6, respectively, on Fig. 2.

Figure 7:
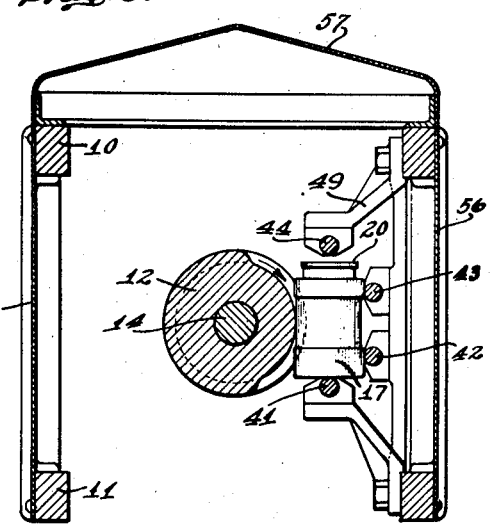

Fig. 7 is a cross-sectional elevation at the line 7—7 on Fig. 3.

Fig. 8 is a fragmentary part-sectional plan view showing the left-hand end portion of the worm conveyor and the means for feeding the containers thereto.

Fig. 8A is a detail view showing a pressure roll and its operating means.

Fig. 9 is a sectional elevation at the line 9—9 on Fig. 2.

Referring to the drawings:

The conveying apparatus is mounted in a framework comprising upper and lower horizontal frame bars 10 and 11 extending lengthwise of the apparatus. The framework is supported on standards 8 (Fig. 1), each standard being adjustably supported on feet 9. Mounted within the framework is a horizontal worm conveyor 12 made in sections mounted end to end on a shaft 14 journalled for rotation in end bearing plates 18. The conveyor 12 is formed with a spiral thread 15 which defines a spiral trough or pocket 16 in which the containers 17 are held as they are advanced by the rotating conveyor. The containers are herein shown as wide-mouthed jars having open tops or neck portions 20.

The jars are fed to the worm conveyor by an endless belt conveyor 21 (Figs. 1 and 2) which runs on a drive pulley 22. The latter is driven by an electric motor 23 having driving connection with the pulley 22 through gearing including a driving belt 24.

The jars 17 are guided into the spiral groove 16 of the worm conveyor, and thereby transferred to the control of the latter, by means of a fence 25. The fence comprises a pair of endless belts 26 positioned one directly over the other and spaced apart vertically, said belts being trained over guide pulleys 27. The fence 25 is positioned at one side of the worm conveyor with the inner strands of the belts 26 spaced from the worm shaft to provide a passageway for the jars 17 as the latter are guided into the spiral pocket 16.

Referring to Fig. 8, the worm shaft comprises a cylindrical portion 30 at the left-hand end of the shaft, and the adjacent end portion of spiral groove 16 is tapered and merges into this cylindrical surface. The tapered portion includes the first few convolutions of the spiral. This permits a very gradual transfer of the jars to the spiral, their direction of movement being changed through only a slight angle, thus providing a smooth and easy transfer of the rapidly advancing jars.

The inner strands of the belts 26 are yieldingly held against the jars by spring-actuated rolls 31 (Figs. 8, 8A, and 9) mounted on rock arms 32 attached to vertical rock shafts 33 journaled in bearing sleeves 34. Coil springs 35 are attached at their upper ends to collars 36 on the shafts 33 and at their lower ends are connected to the bearing sleeves 34. The springs are under tension and operate through the rock arms 32 to apply pressure to the inner strands of the belts 26 and thereby hold the belts with a yielding pressure against the jars 17, thus guiding them into the spiral pocket 16.

The jars 17 may be placed either by hand or by automatic mechanism on the belt conveyor 21, and travel between a pair of horizontal guide rails 37 as they approach the worm conveyor. The rails 37 are adjustably mounted by means of brackets 38 permitting them to be adjustably spaced for jars of different sizes. A star wheel 39 mounted for free rotation, projects into the path of the jars. If the jars are in upright position on the conveyor as they contact the star wheel, they are carried forward to the worm conveyor, but any jar lying on its side is pushed by the star wheel off the conveyor onto an inclined plate 40 directly opposite the star wheel and thereby discharged.

The belt conveyor 21 is driven at a higher speed than that at which the jars are advanced by the worm drive. As a result the jars if they are spaced apart when placed on the belt conveyor, tend to accumulate and be brought together in a solid line as they approach the worm shaft. Owing to the construction of the worm conveyor, with its cylindrical end portion 30 the same or approximately the same diameter as the spiral worm, and the tapered form of the spiral trough 16, the jars are smoothly and reliably transferred to the control of the worm drive. Ordinarily the jars are supplied regularly to the conveyor 21 so that they are brought up to the spiral conveyor in a solid line. The construction, however, provides a dependable and smooth transfer of the articles 17 to the worm conveyor, regardless of whether the jars are brought in a solid line or intermittently to the receiving end of the worm, either at regular or irregular intervals. The worm shaft is adapted also for handling jars and other articles of different diameters throughout a considerable range.

The jars are held in contact with the worm conveyor and guided in their travel therealong by a group of guide rods 41, 42, 43, and 44 extending lengthwise of the conveyor, said rods forming a channel or guideway. The jars are in upright position as they enter this guideway adjacent the left-hand end of the conveyor. As shown in Fig. 4, the rod 41 provides a bottom support for the jars. The rods 42 and 43 are side supports holding the jars against the spiral conveyor, and the rod 44 is positioned over the jars, and preferably spaced a short distance thereabove, permitting a slight up-and-down movement of the jars. The group of guide rods is twisted or extended spirally through an intermediate zone 44a (Fig. 2) for inverting the jars by a movement of revolution about the worm conveyor, and at a more advanced zone 44b (Fig. 3) are given a further spiral twist for reinverting the jars to upright position by a further revolution in the same direction, for purposes hereinafter set forth.

Fig. 4 illustrates the guide rods holding a jar upright before it is inverted. Fig. 5 shows the jar in a position reached during the inverting movement in which it is approximately upside down. It will be noted that the rod 44 is now beneath and supporting the jar while the rod 41 is above the inverted jar. In Fig. 6 the jar is shown fully inverted, while in Fig. 7 the jar is shown reinverted by the spiral twist of the guide rods in the zone 44b (Fig. 3). The guide rods are mounted and held stationary in brackets attached to the frame bars 10 and 11, including the bracket 45 (Figs. 1, 2, and 4) on the front side of the conveyor, brackets 46 and 47 behind the conveyor, and brackets 48, 49 (Figs. 3 and 7) in front of the conveyor.

Referring to Figs. 1 and 4, means for washing the jars includes a pipe 50 having a stationary mounting over the path of the jars adjacent to the intake end of the conveyor. The pipe is provided with a series of downwardly directed nozzles 51 in position to discharge water or other washing fluid into the upright jars. When the jars are made of glass and are to be filled with food products or other commodities which are introduced while hot into the jars, the water discharged from the nozzles 51 is preferably warm or hot for preheating the jars. The amount of water ejected into the jars partially fills them, as for example, one fourth or one half full and thereby floats any foreign materials which may have found their way into the jars, such as dust or particles of paper from the cartons from which the jars have been removed.

After the jars pass beyond the spray nozzles 51 and while traversing the zone 44a, they are rotated through an angle of 180 degrees to the inverted position (Fig. 6), thereby discharging the washing fluid. The longitudinal axis of the jar is maintained substantially perpendicular to the direction of its horizontal travel during such inverting movement. The water may be ejected from the nozzles 51 and into the jars under considerable pressure.

After the jars have been inverted, they are subjected to another washing or spraying operation by means of a spray device including a supply pipe 54 (Fig. 5) and branch pipes which provide upwardly directed nozzles 55. These nozzles are so arranged that they discharge jets of spraying fluid, for example, steam or hot water, upwardly against and into the jar with considerable force. Some of the nozzles discharge in pairs into the fully inverted jars, thereby producing a swirling movement of the liquid and rotation of the jars. In this manner the jars are thoroughly rinsed and particularly the interior surfaces of the shoulder portions so that any particles of glass or other foreign material are dislodged and ejected.

The worm conveyor is enclosed in a casing or tunnel made of sheet material comprising sides 56 and a top cover or hood 57. The hood is connected by hinges 58 to be swung upwardly by means of a handle 59 (Fig. 6) and may be made in separate sections (Fig. 1). The bottom 60 of the casing provides a pan for catching the waste washing fluid and directing it into a discharge pipe 61 (Fig. 1).

The bottles after being washed are transferred immediately from the worm conveyor to a jar filling machine 62 (Fig. 3) here shown as of a Mojonnier type. The worm conveyor 12 is preferably driven through gearing interconnected with the filling machine, whereby the transfer of the jars is synchronized with the movements of said machine. The driving gearing interconnecting said machine and the worm shaft includes a belt driven wheel 63, shaft 64, pinion 65 on shaft 64, and a gear 66 on a shaft 67. The worm conveyor is driven from the shaft 67 through intermeshing gears 68 connected respectively to the shaft 67 and a shaft 68' journaled in a gear box 69. The shaft 68' has driving connection with the worm shaft through gearing which may include a friction safety clutch within the gear box 69. A spur gear 70 on the shaft 67 drives a gear 71 which runs in mesh with a ring gear 72 on the filling machine. The gear 72 drives a star wheel 73 which transfers the jars 17 from the worm conveyor to the filling machine. The jars after being filled are removed from said machine by a transfer wheel 74 connected to the gear 71.

As shown in Fig. 3, the pitch of the spiral trough 16 is gradually increased as it approaches the discharge end of the conveyor, by gradually increasing the width of the thread 15 and the diameter of the shaft. In this manner, the speed of the jars is accelerated to approximately the peripheral speed of the transfer star wheel 73, so that a smooth transfer is obtained. Each jar as it reaches the end of the worm conveyor, is picked up by the star wheel 73 and carried thereby into the filling machine.

Modifications may be resorted to within the spirit and scope of our invention.

We claim:

1. Article conveying apparatus comprising a horizontally-disposed worm conveyor comprising a cylindrical body formed with a spiral thread extending therealong and defining a spiral trough, means for rotating said conveyor about its axis, stationary guide rods extending lengthwise of the conveyor in position to hold articles in said trough and cause them to be advanced horizontally by the rotation of the conveyor, said worm conveyor having a cylindrical end portion at the intake end of the conveyor, the said trough adjacent said end being tapered toward said end through several convolutions thereof and merging into the cylindrical surface of said end portion.

2. The combination of a horizontal worm conveyor, a horizontal traveling belt carrier parallel with the axis of said conveyor and extending along the worm conveyor adjacent to one end thereof for delivering open-mouthed containers in upright position to said conveyor, and stationary guiding means comprising guiding surfaces extending along the conveyor in position to hold the containers in said upright position during the initial portion of their travel along the conveyor, said guiding means extending spirally around the conveyor through substantially 180° in position for guiding the articles and revolving them about the worm conveyor to an inverted position, said guiding means being further extended along the conveyor in a straight line for retaining the containers in said inverted position through a predetermined portion of their travel, said guiding means then extending spirally in the same spiral direction through substantially 180° for further revolving the containers and reinverting them to upright position.

3. Article conveying apparatus including, a worm conveyor comprising a shaft formed with a spiral thread defining a trough extending spirally along the shaft, a support on which the said shaft is rotatably mounted, means for rotating said shaft about its axis, said worm conveyor having a cylindrical end portion at the intake end of the conveyor, a portion of the trough adjacent to said end being tapered toward and merging into said cylindrical surface, a belt conveyor by which articles are advanced to the worm conveyor, a support on which the belt conveyor is mounted in substantial parallelism with the worm conveyor and in overlapping relation at said intake end of the worm conveyor, guiding means spaced from and extending along the worm conveyor and cooperating with the belt conveyor for guiding articles, as they advance with the belt conveyor, in a path by which the articles are brought into contact with said cylindrical end portion, and means for driving the belt conveyor at a higher speed than that at which the articles are advanced by the worm conveyor.

4. The combination of a worm conveyor comprising a shaft, said conveyor having a spiral conveying surface extending lengthwise of the shaft and concentric therewith, a support on which the said conveyor is mounted for rotation about said axis with the axis horizontally disposed, means for delivering open-mouthed containers in upright position to the conveyor adjacent to one end thereof, said means comprising a belt conveyor parallel with and overlapping the receiving end portion of the worm conveyor, means for rotating the worm conveyor about its axis and thereby causing it to impart forward movement to the containers, stationary guiding means extending along the worm conveyor in position to hold the containers in contact therewith, said guiding means comprising article inverting and reinverting portions, said portions each having article guiding surfaces extending spirally around the worm conveyor concentrically therewith through substantially a half circumference.

5. The combination of a worm conveyor comprising a shaft and having a spiral conveying surface extending lengthwise of the shaft and concentric therewith, a support in which the shaft is horizontally mounted for rotation, means for rotating the conveyor about the axis of said shaft and thereby causing open-mouthed containers delivered in upright position to one end thereof to be advanced by the conveyor, and stationary guiding means comprising guiding surfaces extending along said conveyor and spaced therefrom to provide a passageway for the said containers, said surfaces including upper and lower surfaces, the latter positioned to provide a bottom support for the traveling containers, and an intermediate surface positioned to engage the side walls of the containers and hold them in contact with the spiral conveying surface, said guiding surfaces including article inverting and reinverting sections, each said section extending spirally around the conveyor through substantially a half circumference.

6. The combination of a worm conveyor comprising a shaft and having a spiral conveying surface extending lengthwise of the shaft and concentric therewith, a support in which the shaft is horizontally mounted for rotation, means for rotating the conveyor about the axis of said shaft and thereby causing open-mouthed containers delivered in upright position to one end thereof to be advanced by the conveyor, and stationary gliding means comprising a series of guiding rods to engage, respectively, the bottoms, sides and tops of the containers, said rods extending along the conveyor and spaced therefrom in position to hold the said containers in contact with the spiral driving surface, the series of rods including an article inverting section and a reinverting section, the portions of the rods comprising each said section being extended spirally around the conveyor through an angular distance of substantially 180°.

7. The combination of a worm conveyor comprising a shaft and having a spiral conveying surface extending lengthwise of the shaft and concentric therewith, a support in which the shaft is horizontally mounted for rotation, means for rotating the conveyor about the axis of said shaft and thereby causing open-mouthed containers delivered in upright position to one end thereof to be advanced by the conveyor, stationary guiding means comprising a series of guiding rods to engage, respectively, the bottoms, sides and tops of the containers, said rods extending along the conveyor and spaced therefrom in position to hold the said containers in contact with the spiral driving surface, the series of rods including an article inverting section and a reinverting section, the portions of the rods comprising each said section being extended spirally around the conveyor through an angular distance of substantially 180°, and means for delivering the articles to the spiral conveyor and directing them into position between the said guide rods and the spiral conveying surface, said directing means comprising a belt extending substantially parallel with the conveyor shaft along and spaced from an end portion of the conveyor to provide a guideway for the containers, and pulleys on which said belt is mounted.

8. The combination of a worm conveyor comprising a shaft and having a spiral conveying surface extending lengthwise of the shaft and concentric therewith, a support in which the shaft is horizontally mounted for rotation, means for rotating the conveyor about the axis of said shaft and thereby causing open-mouthed containers delivered in upright position to one end thereof to be advanced by the conveyor, stationary guiding means comprising a series of guiding rods to engage, respectively, the bottoms, sides and tops of the containers, said rods extending along the conveyor and spaced therefrom in position to hold the said containers in contact with the spiral driving surface, the series of rods including an article inverting section and a reinverting section, the portions of the rods comprising each said section being extended spirally around the conveyor through an angular distance of substantially 180°, means for delivering the articles to the spiral conveyor and directing them into position between the said guide rods and the spiral conveying surface, said directing means comprising a belt extending substantially parallel with the conveyor shaft along and spaced from an end portion of the conveyor to provide a guideway for the containers, pulleys on which said belt is mounted, and pressure means for holding the belt against the articles with a yielding pressure, said pressure means including a series of spring actuated rolls bearing against said belt in position and in a direction to apply a yielding pressure of the belt against the articles as the latter advance between the belt and the spiral conveying surface.

9. Article conveying apparatus including a worm conveyor comprising a shaft in the form of a cylinder spirally recessed to form a trough extending spirally along the shaft with a spiral thread formed by and between the convolutions of the trough, a support on which the shaft is rotatably mounted, means for rotating the shaft about its axis in a direction to cause articles held in contact with the spiral surface to be conveyed along the shaft from the intake end of the conveyor toward the opposite end thereof, a portion of the trough adjacent to said intake end being tapered and merging into a non-recessed cylindrical surface portion of the shaft at said intake end, a belt conveyor by which articles are advanced to the worm conveyor, a support on which the belt conveyor is mounted in substantial parallelism with the worm conveyor and in overlapping relation thereto at said intake end, means for driving the belt conveyor, and guiding means spaced from and extending along the worm conveyor and cooperating with a belt conveyor for guiding articles, as they are advanced with the belt conveyor, in a path by which the articles are brought into contact with said cylindrical end portion and thence along the said shaft into engagement with the wall of the trough, thereby transferring the articles to the control of the worm conveyor.

JOHN HOHL.
ROBERT K. BELNAP, Jr.
HERBERT A. BARNBY.

REFERENCES CITED

The following references are of record in the file of this patent:

UNITED STATES PATENTS

| Number | Name | Date |
|---|---|---|
| 450,018 | Hopcraft | Apr. 7, 1891 |
| 643,001 | Overton | Feb. 6, 1900 |
| 703,190 | Geurink | June 24, 1902 |
| 931,434 | Krummel et al. | Aug. 17, 1909 |
| 1,423,698 | Thurston | July 25, 1922 |
| 1,608,499 | Fuller | Nov. 30, 1926 |
| 1,621,611 | Thompson | Mar. 22, 1927 |
| 1,850,067 | Ayars | Mar. 22, 1932 |
| 2,259,748 | Hullhorst | Oct. 21, 1941 |
| 2,284,286 | Krueger | May 26, 1942 |
| 2,336,606 | Everett | Dec. 14, 1943 |